United States Patent [19]

Simidian

[11] Patent Number: 4,736,280
[45] Date of Patent: Apr. 5, 1988

[54] COMBINATION COLLISION AVOIDANCE VISUAL DISPLAY AND PAPER PRODUCTS DISPENSER

[76] Inventor: Ara V. Simidian, 335 NW. 93rd Ave., Coral Springs, Fla. 33071

[21] Appl. No.: 876,707

[22] Filed: Jun. 20, 1986

[51] Int. Cl.⁴ .............................................. B60Q 1/00
[52] U.S. Cl. .................................... 362/80; 362/253; 340/87
[58] Field of Search ................... 362/253, 61, 80, 269, 362/275, 285, 287, 418, 97, 99; 340/84, 87, 97, 99, 135; 221/45, 199; 40/541; 224/273

[56] References Cited

U.S. PATENT DOCUMENTS

| | | | |
|---|---|---|---|
| 1,500,998 | 7/1924 | Kuhn | 36/280 |
| 2,517,119 | 8/1950 | Duc | 340/87 |
| 3,432,808 | 3/1969 | Fleece | 340/84 |
| 3,665,392 | 5/1972 | Annas | 340/97 |
| 3,905,017 | 9/1975 | Samra | 362/80 |

FOREIGN PATENT DOCUMENTS 624300 7/1961 Canada ................................ 221/45

Primary Examiner—William A. Cuchlinski, Jr.
Assistant Examiner—D. M. Cox
Attorney, Agent, or Firm—Richard L. Miller

[57] ABSTRACT

A combination avoidance visual display and paper products dispenser is provided and consists of automobile brake warning safety and directional indicator lights combined with a dispenser for paper products being paper towels and paper tissues which is preferably centered and operated on a rear window platform of a motor vehicle.

8 Claims, 1 Drawing Sheet

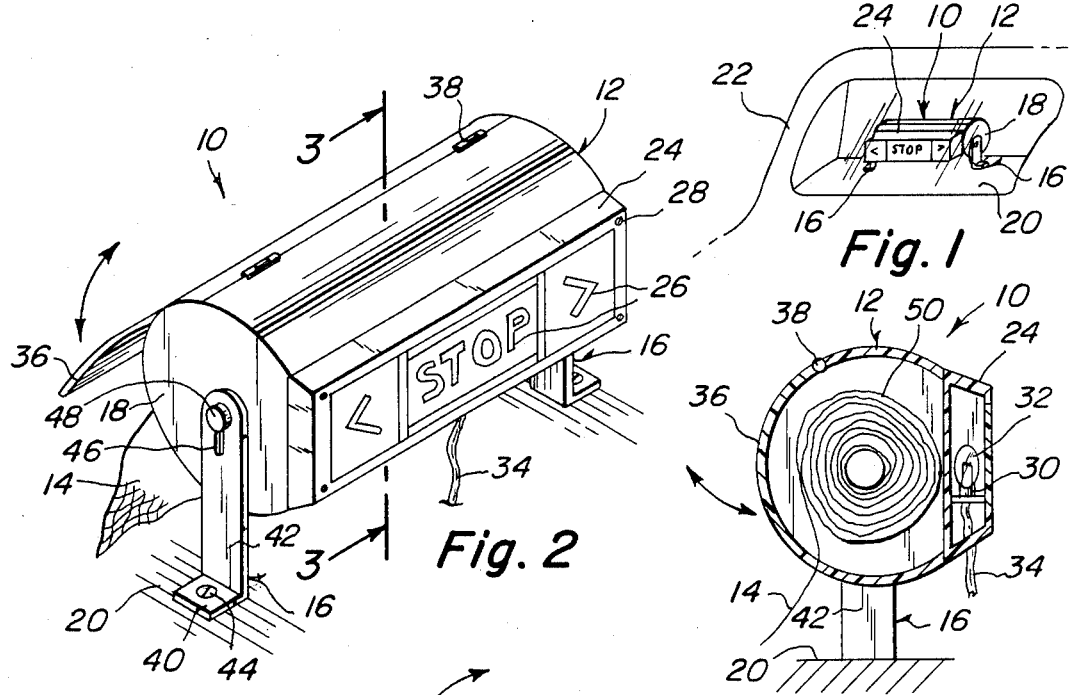
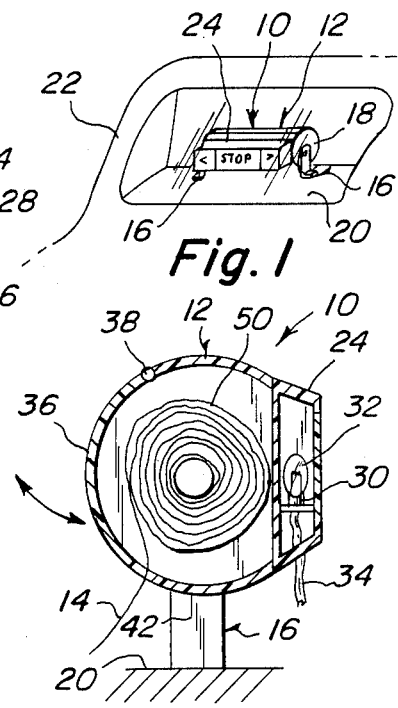
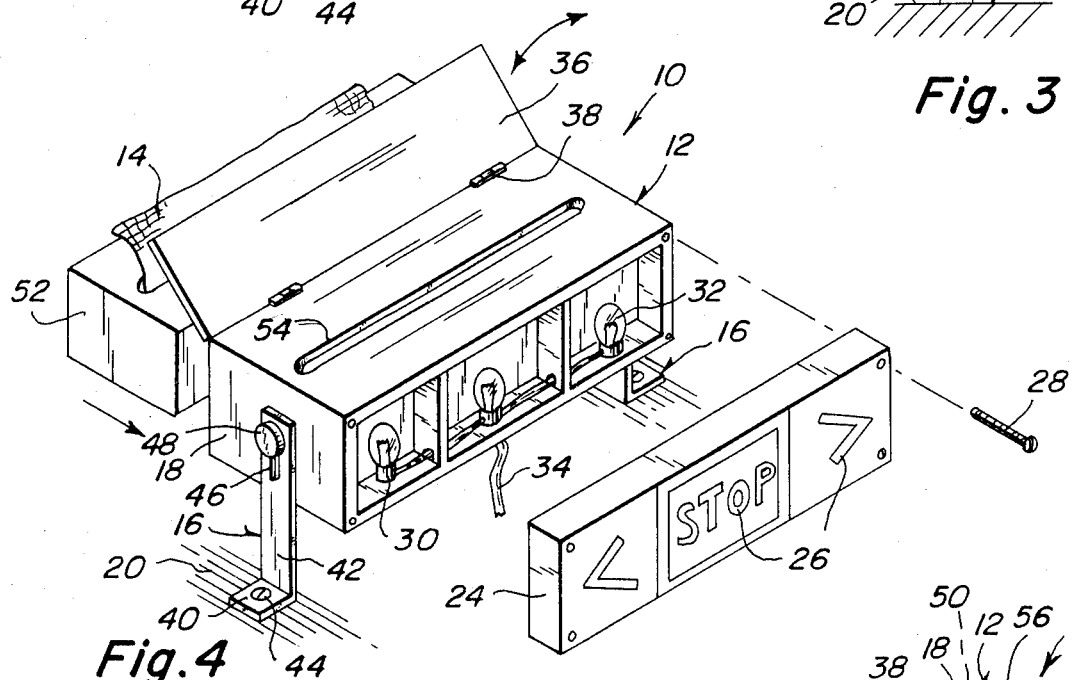
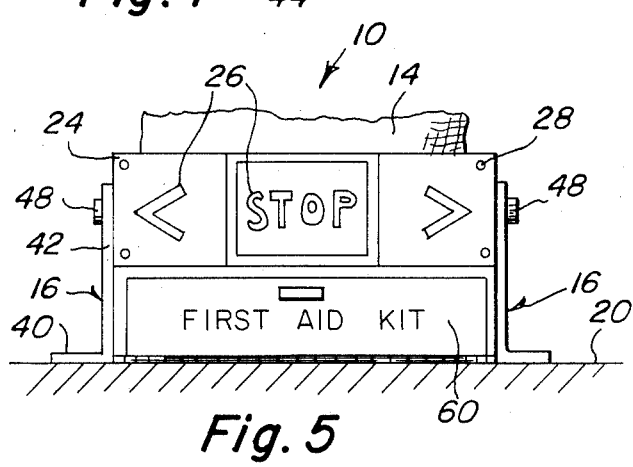
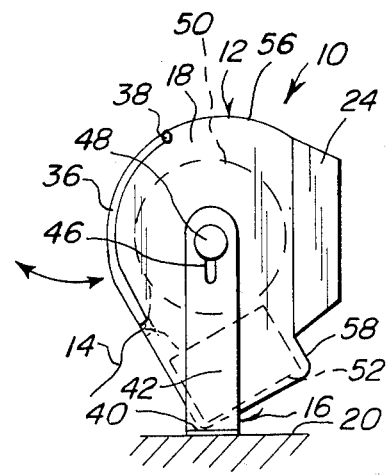

COMBINATION COLLISION AVOIDANCE VISUAL DISPLAY AND PAPER PRODUCTS DISPENSER

BACKGROUND OF THE INVENTION

The instant invention relates generally to illumination devices and more specifically it relates to a combination collision avoidance visual display and paper products dispenser.

Numerous illumination devices have been provided in prior art that are adapted for viewing information and the like, particularly in the dark. For example U.S. Pat. Nos. 2,501,840; 2,629,043 and 3,432,808 all are illustrative of such prior art, while these units may be suitable for the particular purpose to which they address, they would not be as suitable for the purposes of the present invention described.

SUMMARY OF THE INVENTION

A primary object of the present invention is to provide a combination collision avoidance visual display and paper products dispenser that will overcome the shortcomings of the prior art devices.

Another object is to provide a combination collision avoidance visual display and paper products dispenser that includes automotive brake warning safety and directional indicator lights combined with a dispenser for paper products which is preferably centered and operated on rear window platform of a motor vehicle.

An additional object is to provide a combination collision avoidance visual display and paper products dispenser in which the dispenser is for paper towels and/or paper tissues and can also hold a first aid kit.

A further object is to provide a combination collision avoidance visual display and paper products dispenser that is simple and easy to use.

A still further object is to provide a combination collision avoidance visual display and paper products dispenser that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the rear window portion of a motor vehicle showing the invention installed therein.

FIG. 2 is a perspective view of the invention holding a roll of paper towels.

FIG. 3 is a cross sectional view taken along line 3—3 in FIG. 2 showing the internal construction thereof.

FIG. 4 is a perspective view partly exploded of a modification holding a tissue box.

FIG. 5 is a front view of another modification having a first aids kit.

FIG. 6 is a side view of still another modification designed to hold either a rollof paper towels on a box of paper tissues within.

DETAILED DESCRIPTION OF THE PREFERRED EMBODIMENTS

Turning now descriptively to the drawings, in which similar reference characters denote similar elements throughout the several views, FIGS. 1 through 6 illustrate a combination collision avoidance visual display and paper products dispenser 10 that consists of a housing 12 for holding paper products 14 which can be dispensed therefrom. A pair of legs 16 are provided. Each of the legs 16 is adjustably mounted to one side 18 of the housing 12 so that the housing can be preferably centered and positioned on rear window platform roof of a motor vehicle 22.

A panel 24 that has brake warning safety and directional indicator indicia 26 thereon is mounted with bolts 28 to front of the housing 12. Lamp sockets 30 with lamps 32 within the housing 12 is for illuminating the indicia 26 on the panel. The sockets 30 are electrically connected by wire 34 to brakes and indicator mechanism (not shown) of the motor vehicle 22. A door 36 is hinged at 38 to rear of the housing 12 so that the paper products 14 can be installed therein to be dispensed therefrom.

Each of the legs 16 is L-shaped and has a short arm 40 and a long arm 42. The short arm 40 is mounted with screw 44 to the rear window platform 20 and the long arm 42 has a slot 46 at end thereof. A pair of knobs 48 are provided. Each of the knobs has a threaded shaft (not shown) to extend through the slot 46 and into one of the sides 18 of the housing 12 so that the housing can be height and angularly adjusted.

As shown in FIGS. 1, 2 and 3 the housing 12 is cylindrical to hold a roll of paper towels 50. In FIGS. 4 and 5 the housing 12 is box shaped to hold a box of paper tissues 52. The housing 12 has a top slot 54 so that the tissues can be dispensed therefrom, in FIG. 6 the housing 12 includes an upper portion 56 that is cylindrical and a lower portion 58 that is boxed shaped. This housing can hold a roll of paper towels 50 in the upper portion. A first aid kit 60 can be mounted to under side of the housing 12 as shown in FIG. 5.

In operative use the device makes very efficient use of the limtied rear window platform space in a vehicle so as to provide both a useful storage place for paper products etcetera while at the same time supplying visual information to observers. It is to be further noted that while although lamps are illustrated to light the indicia indicating display that there are a host of other visual diaplay mechanisms that could be equally well substituted to mention just a few are as follows: light emitting diodes, liquid crystals, and mechanical mechanisms.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A combination collision avoidance visual display and paper products dispenser which comprises:
    (a) a housing for holding add dispensing paper products which can be dispensed there from;

(b) a pair of legs, each of said legs adjustably mounted to one side of said housing so that said housing can be preferably centered and positioned on rear window platform of a motor vehicle;

(c) a panel having brake warning safety and directional indicator indicia thereon mounted to front of said housing; and (d) means within said housing, for visually indicating said indicia on on said panel electronically connected to brakes and indicator mechanism of said motor vehicle.

2. A combination collision avoidance visual display and paper products dispenser as recited in claim 1 further comprising a door hinged to rear of said housing so that said paper products can be installed therein to be dispensed therefrom.

3. A combination collision avoidance visual display and paper products dispenser as recited in claim 2 further comprising:

(a) each of said legs being L-shaped having a short arm and a long arm, wherein said short arm is mounted to said long arm having a slot at the end thereof; and (b) a pair of knobs, each of said knobs having a threaded shaft to extend through said slot and into one of said sides of said housing so that said housing can be height and angularly adjusted.

4. A combination collision avoidance visual display and paper products dispenser as recited in claim 3 wherein said illuminating means includes a plurality of lamp sockets, each having a lamp therein.

5. A combination collision avoidance visual display and paper products dispenser as recited in claim 4 wherein said housing is cylindrical to hold a roll of paper towels.

6. A combination collision avoidance visual display and paper products dispenser as recited in claim 4 wherein said housing is box shaped to hold a box of paper tissues, said housing having a top slot that said tissues can be disposed therefrom.

7. A combination collision avoidance visual display and paper products dispenser as recited in claim 4 wherein said housing includes an upper portion that is cylindrical and a lower portion that is box shaped so that said housing can hold a roll of paper towels in said upper portion and can hold a box of paper tissues in said upper lower portion.

8. A combination collision avoidance visual display and paper products dispenser as recited in claim 6 further comprising a first aid kit mounted on under side of said housing.

* * * * *